(12) United States Patent
Kim et al.

(10) Patent No.: US 7,852,450 B2
(45) Date of Patent: Dec. 14, 2010

(54) LIQUID CRYSTAL DISPLAY DEVICE AND METHOD OF FABRICATING THE SAME

(75) Inventors: Jeom Jae Kim, Seoul (KR); Sang Yoon Paik, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 375 days.

(21) Appl. No.: 10/981,429

(22) Filed: Nov. 4, 2004

(65) Prior Publication Data
US 2005/0099578 A1    May 12, 2005

(30) Foreign Application Priority Data
Nov. 8, 2003    (KR)    ...................... 10-2003-0078853

(51) Int. Cl.
G02F 1/1339 (2006.01)
G02F 1/1333 (2006.01)
G02F 1/1335 (2006.01)
(52) U.S. Cl. .................. 349/156; 349/106; 349/110
(58) Field of Classification Search ......... 349/155–156, 349/106, 110, 139
See application file for complete search history.

(56) References Cited
U.S. PATENT DOCUMENTS

| | | | | |
|---|---|---|---|---|
| 6,097,467 A | | 8/2000 | Fujimaki et al. ............ | 349/155 |
| 6,111,624 A | * | 8/2000 | Matsuoka et al. ........... | 349/106 |
| 6,411,360 B1 | | 6/2002 | Matsuyama et al. ......... | 349/156 |
| 6,597,425 B2 | | 7/2003 | Kadota et al. ............... | 349/156 |
| 7,126,662 B2 | * | 10/2006 | Choi et al. .................. | 349/155 |

FOREIGN PATENT DOCUMENTS

JP    11-084386    3/1999

OTHER PUBLICATIONS

Office Action dated Sep. 29, 2006 for corresponding Chinese Patent Application No. 200410088628.8.

* cited by examiner

*Primary Examiner*—Dung T. Nguyen
(74) *Attorney, Agent, or Firm*—Brinks Hofer Gilson & Lione

(57) ABSTRACT

A liquid crystal display device is disclosed that is capable of preventing poor alignment caused by a column spacer to improve the contrast ratio. The liquid crystal display device includes a color filter and column spacers located between a first substrate and a second substrate. The column spacers maintain the cell gap between the first and second substrates. The color filter contains pixels having multiple sub-pixels of different colors. The column spacers in regions of sub-pixels of the same color are randomly formed within the regions.

8 Claims, 12 Drawing Sheets

LIQUID CRYSTAL DISPLAY DEVICE AND METHOD OF FABRICATING THE SAME

This application claims the benefit of Korean Patent Application No. P2003-78853 filed in Korea on Nov. 8, 2003, which is hereby incorporated by reference.

BACKGROUND OF THE INVENTION

1. Field of the Invention

The present invention relates to a liquid crystal display device, and more particularly, to a liquid crystal display device capable of preventing poor alignment caused by a column spacer to improve a contrast ratio.

2. Description of the Related Art

In general, a liquid crystal display (LCD) device controls the light transmittance of liquid crystal cells in response to video signals to thereby display pictures corresponding to the video signals on a liquid crystal display panel. To this end, the LCD device includes a liquid crystal display panel having liquid crystal cells arranged in an active matrix form, and driving circuits for driving the liquid crystal display panel.

Depending on a direction of an electric field driving a liquid crystal material, the LCD device is generally classified into two modes—a twisted nematic (TN) mode using a vertical electric field and an in-plane switching (IPS) mode using a horizontal electric field.

The TN mode LCD device drives the liquid crystal material using a vertical electric field formed between a common electrode and an opposing pixel electrode. The TN mode LCD device has high aperture ratios, but narrow viewing angles. The IPS mode LCD device drives the liquid crystal material using a horizontal electric field formed between the pixel electrode and the common electrode located in parallel on one substrate. The IPS mode LCD device has wide viewing angles, but low aperture ratios.

FIG. 1 is a plan view illustrating a related art IPS mode liquid crystal display panel.

Referring to FIG. 1, the IPS mode liquid crystal display panel includes: a color filter array substrate having a black matrix, a color filter, a planarization layer, a column spacer 13, and an upper alignment layer, which are sequentially formed on an upper substrate whose rear surface is covered with materials (not shown) for a transparent electrode for preventing static electricity; a thin film transistor array substrate having a thin film transistor (TFT), a common electrode, a pixel electrode, and a lower alignment layer, all of which are formed on a lower substrate; and a liquid crystal material (not shown) injected in the inner space between the color array substrate and the thin film transistor array substrate.

The column spacer 13 is regularly formed at a defined location on a red sub-pixel R region within one pixel having red, green and blue sub-pixels to serve to maintain a cell gap between the color filter array substrate and the thin film transistor array substrate. Also, the column spacer 13 may be regularly formed at a defined location on a green sub-pixel G region within one pixel and may be regularly formed at a defined location on a blue sub-pixel B region within one pixel.

Meanwhile, a rubbing process is performed on the upper and the lower alignment films in order to control initial alignment of the liquid crystal disposed therebetween. In the rubbing process, a rubbing roller rolls up a rubbing material. The surface of the alignment film is rubbed using the rubbing roller with the rubbing material in a direction defined from upward to downward such as in a direction parallel to an alignment direction A of the column spacer 13 as shown in FIG. 2.

However, if the rubbing process is performed, then the rubbing material passes by the column spacer 13 regularly formed on the defined location, to thereby cause sectional damage at a particular portion of the rubbing material.

In other words, a rubbing scratch S, representing uneven alignment concentrated along the column spacer 13 arranged in a line as shown in FIG. 2, occurs, to thereby generate light leakage. As a result, a black brightness is increased, to thereby deteriorate the contrast ratio.

Meanwhile, in order to prevent the sectional damage in the rubbing material, as shown in FIG. 3, there has been proposed a structure, in which the column spacer 13 is formed within the other sub-pixels in one pixel. However, the red, green and blue color filters have different thicknesses due to process deviations. Accordingly, the cell gap is uneven.

SUMMARY

By way of introduction only, a liquid crystal display device according to an embodiment includes column spacers located between a first substrate and a second substrate to maintain a cell gap. The column spacers are randomly formed in sub-pixels of the same color.

The display device has pixels of multiple sub-pixels including red, green, and blue sub-pixels. A column spacer is located in each pixel.

The first substrate includes a black matrix, a color filter formed on the black matrix, and a common electrode formed on the color filter.

The first substrate includes a black matrix, a color filter formed on the black matrix, and a planarization layer formed to cover the color filter.

A method of fabricating a liquid crystal display device includes forming first and second substrates and forming column spacers maintaining a cell gap between the first and the second substrate. The column spacers in regions of sub-pixels of the same color are randomly formed within the sub-pixel regions.

Each pixel includes red, green, and blue sub-pixels and has a column spacer located therein.

Forming the first substrate includes: forming a black matrix; forming a color filter on the black matrix; and forming a common electrode on the color filter.

Forming the first substrate includes: forming a black matrix; forming a color filter on the black matrix; and forming a planarization layer to cover the color filter.

BRIEF DESCRIPTION OF THE DRAWINGS

The following detailed description of the embodiments of the present invention reference the accompanying drawings, in which.

DETAILED DESCRIPTION

Reference will now be made in detail to the preferred embodiments of the present invention, examples of which are illustrated in the accompanying drawings.

Hereinafter, the preferred embodiments of the present invention will be described in detail with reference to FIGS. 4 to 7.

Figure 1:
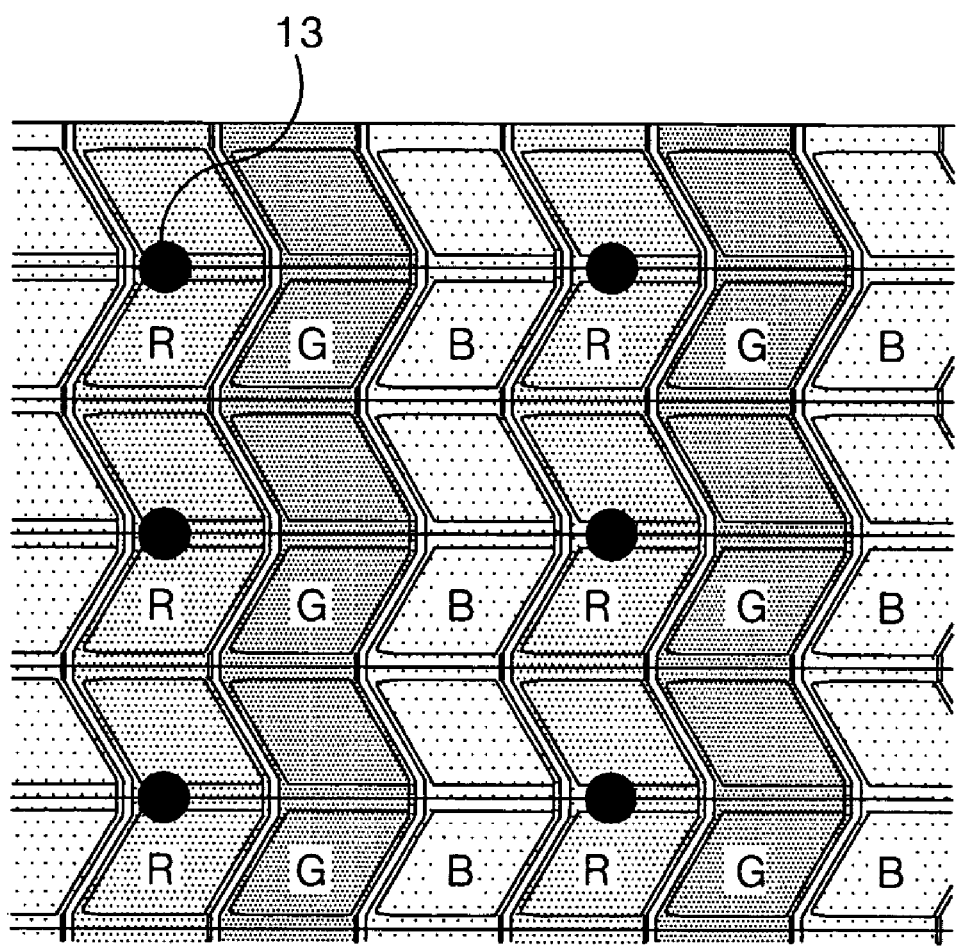
FIG. 1 is a plan view illustrating a related art IPS mode liquid crystal display panel.
Figure 2:
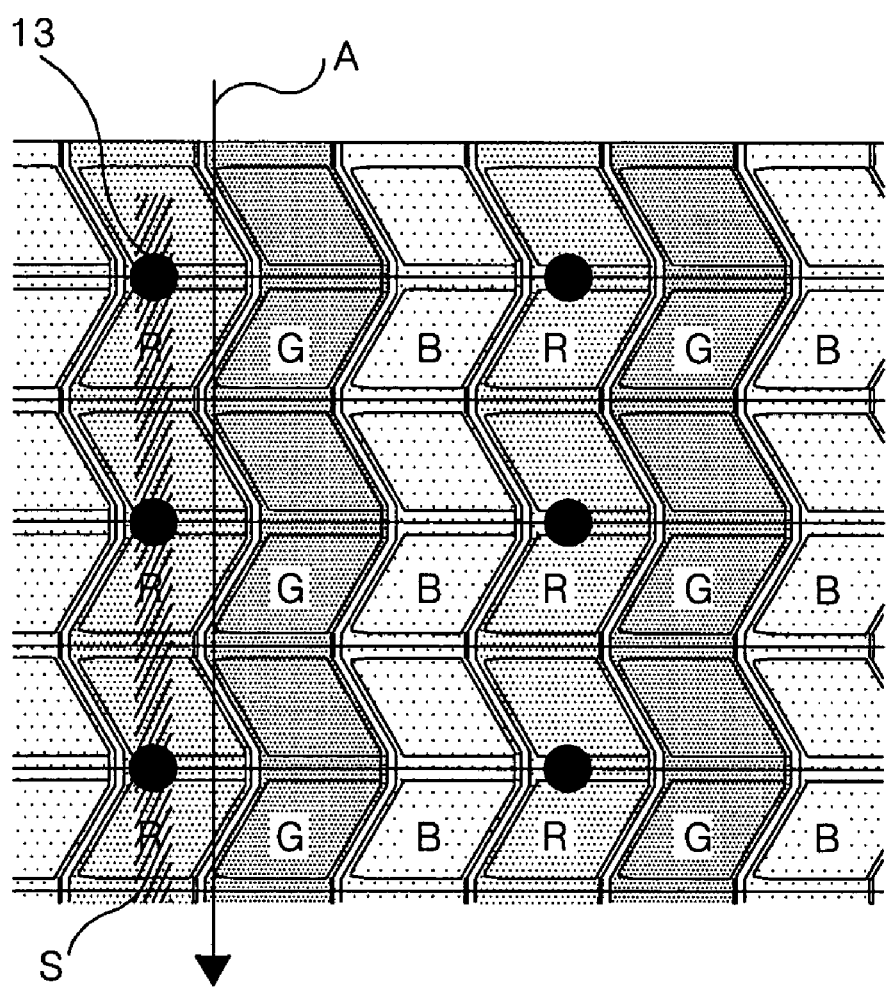
FIG. 2 is a diagram representing a scratch made during a rubbing process of the related liquid crystal display panel.
Figure 3:
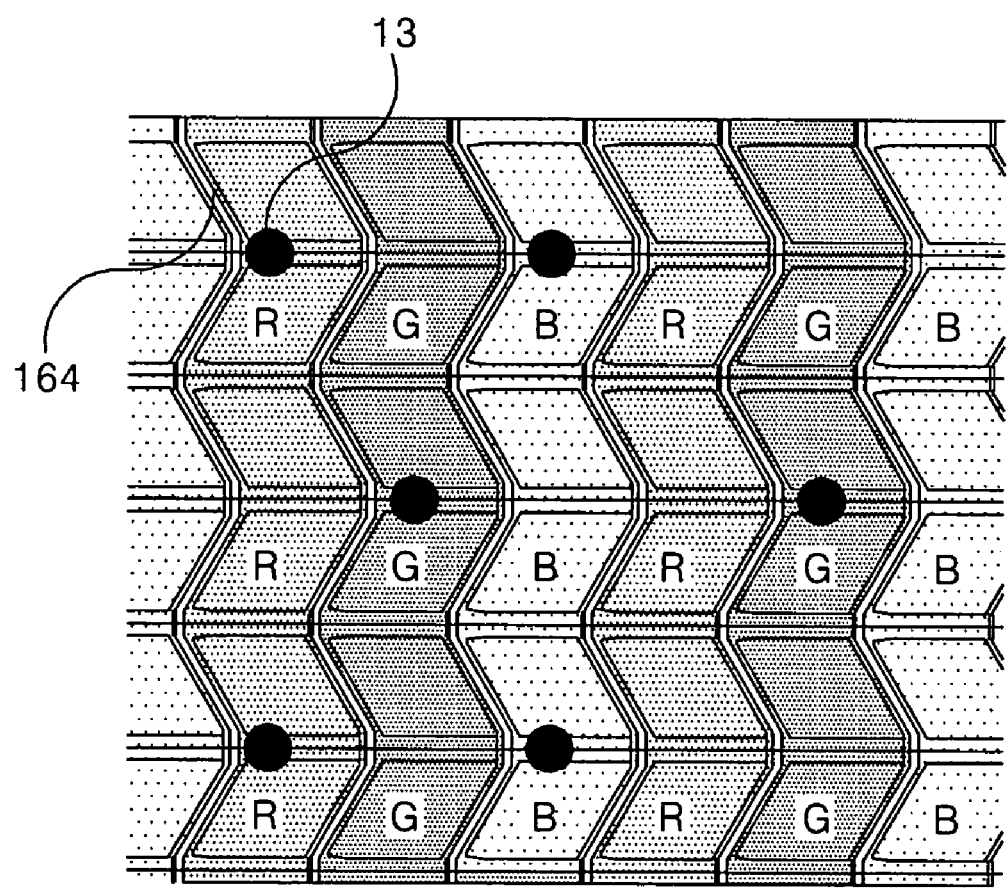
FIG. 3 is a plan view illustrating the liquid crystal display panel having a structure in which a related art column spacer is formed within the other sub-pixels in one pixel.
Figure 4:
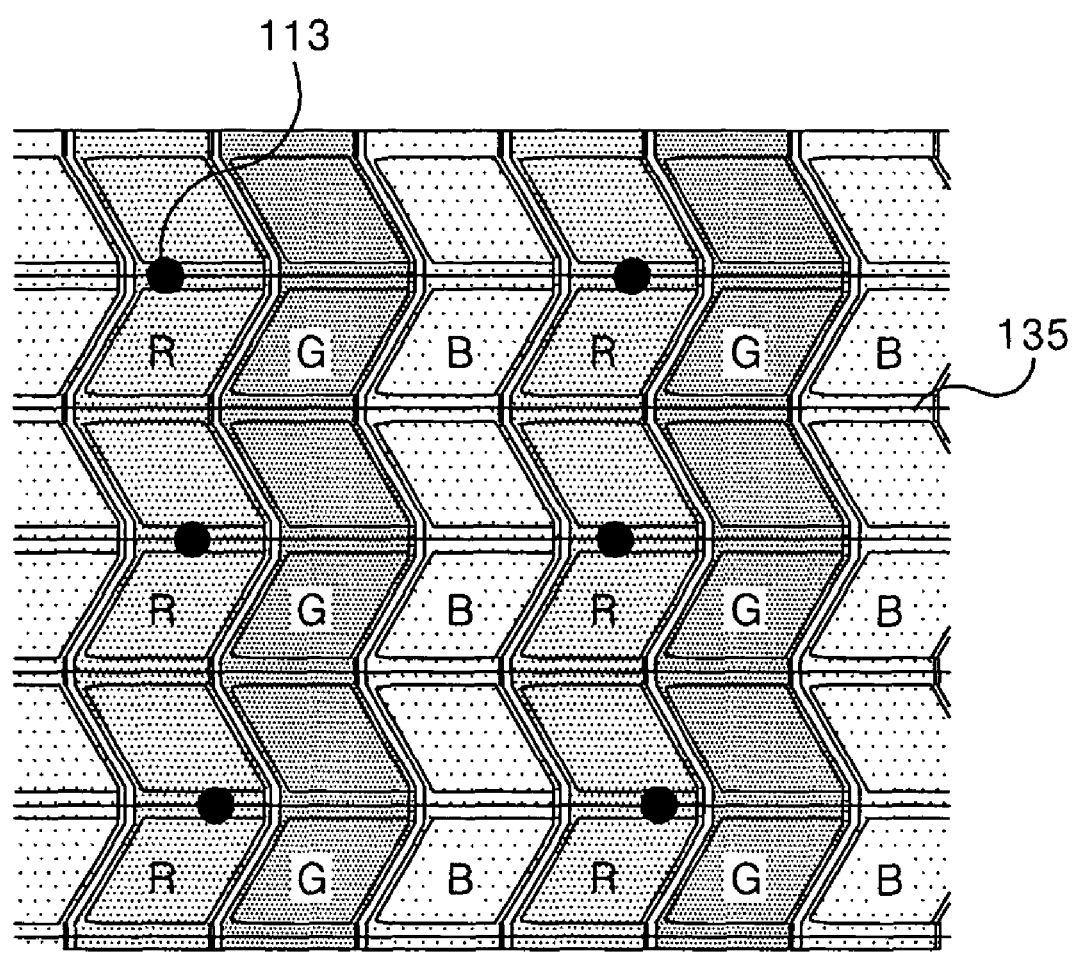
FIG. 4 is a plan view illustrating a liquid crystal display panel according to one embodiment of the present invention.
Figure 5:
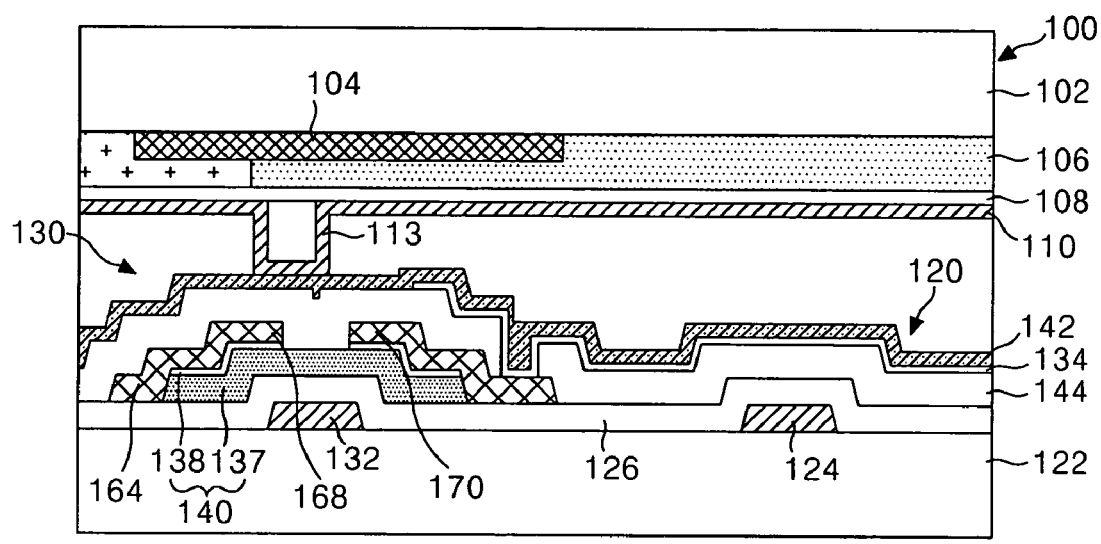
FIG. 5 is a sectional view showing a portion of the liquid crystal display panel shown in FIG. 4.

FIG. 4 is a plan view illustrating an IPS mode liquid crystal display panel according to an embodiment of the present invention, and FIG. 5 is a sectional view showing a portion of the liquid crystal display panel shown in FIG. 4.

Referring to FIGS. 4 and 5, the IPS mode liquid crystal display panel includes: a color filter array 100 substrate having a black matrix 104, a color filter 106, a planarization layer 108, a column spacer 113, and an upper alignment layer 110, all of which are sequentially formed on an upper substrate 102 whose rear surface is covered with materials (not shown) for a transparent electrode to prevent static electricity; a thin film transistor array substrate 120 having a thin film transistor (TFT) 130, a common electrode 124, a pixel electrode 134, and a lower alignment layer 142, all of which are formed on a lower substrate 122; and liquid crystal material (not shown) injected in the inner space between the color filter array substrate 100 and the thin film transistor array substrate 120.

In the color filter array substrate 100, the black matrix 104 is formed so as to overlap the area of the TFT 130 on the lower substrate 122 and with the area (not shown) of gate and data lines, and partitions the cell regions at which the color filter 106 is to be formed. The black matrix 104 serves to prevent light leakage and absorb external light, to thereby improve the contrast ratio. The color filter 106 is formed at the cell region partitioned by the black matrix 104. The color filter 106 is formed by separate red (R), green (G), and blue (B) filters and represents red, green, and blue colors. The planarization layer 108 is formed to cover the color filter 106 and planarizes the upper substrate 102. The column spacer 113 maintains the cell gap between the upper substrate 102 and the lower substrate 122.

The column spacer 113 is formed on a red sub-pixel R region in one pixel including red, green, blue color filter 106. Each column spacer 113 is randomly formed on each red sub-pixel R region irrespective of a defined regulation. Accordingly, when a rubbing process for aligning a liquid crystal material is performed, sectional damage of the rubbing material is prevented.

In the thin film transistor array substrate 120, the TFT 130 includes: a gate electrode 132 along with a gate line 135 formed on the lower substrate 122; a semiconductor layer 140 formed to overlap the gate electrode 132 with a gate insulating layer 126 positioned therebetween; and source/drain electrodes 168 and 170 formed along with a data line 164 with the semiconductor layer 140 positioned therebetween.

The TFT supplies pixel signals from the data line to the pixel electrode 134 in response to scan signals from the gate line 135.

The pixel electrode 134 is made of a transparent conductive material with a high light transmittance, and contacts a drain electrode 170 of the TFT 130 with a passivation film 144 positioned therebetween. The common electrode 124 is formed in a stripe form so as to alternate with the pixel electrode 134. A common voltage to drive the liquid crystal material is applied to the common electrode 124.

A horizontal electric field formed by the common voltage and a pixel voltage supplied to the pixel electrode 134 makes the liquid crystal material rotate in a horizontal direction.

As set forth above, according to the embodiment of the liquid crystal display panel, the column spacer 113 is randomly formed on the red sub-pixel R region in one pixel region without having a defined regulation. Accordingly, when a rubbing process is performed, sectional damage caused by the column spacer 113 is prevented and the alignment becomes uniform. Thus, the contrast ratio is improved.

Figure 6:
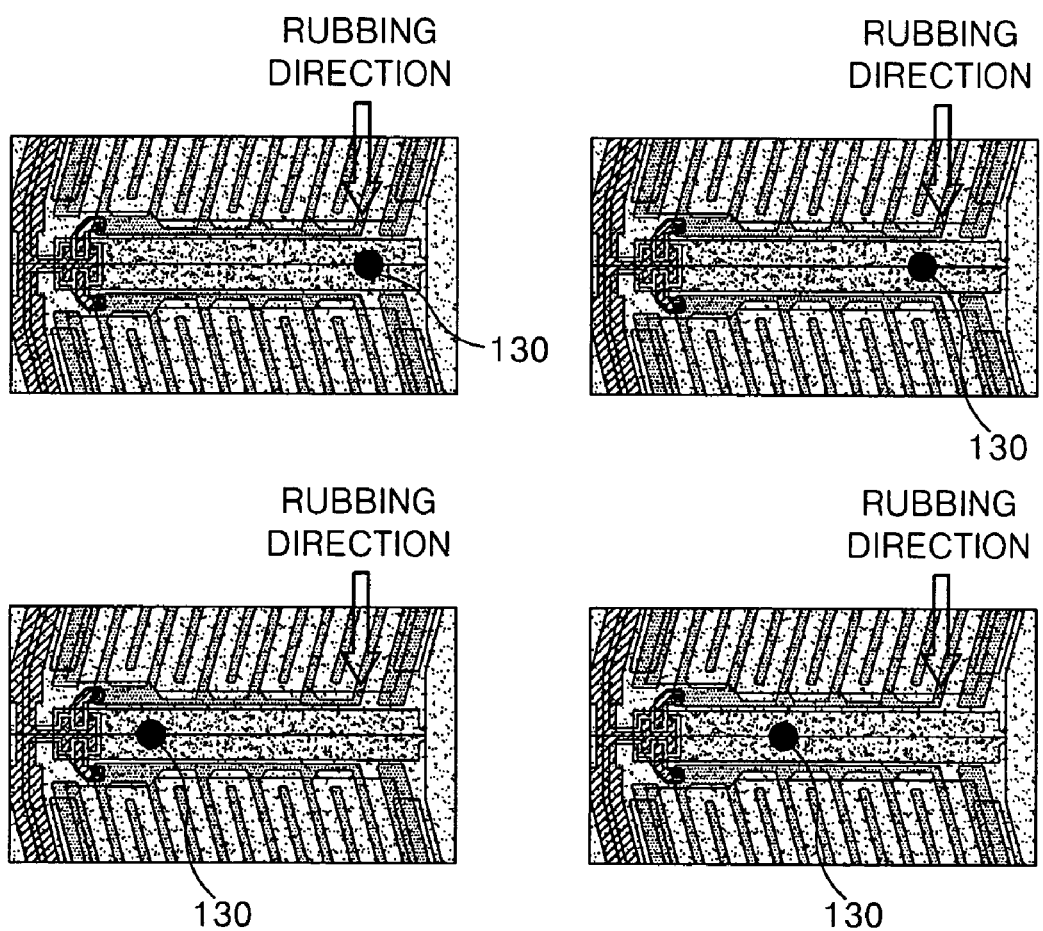
FIG. 6 shows randomly formed column spacers on the sub-pixel in the pixel shown in FIG. 3.

More specifically, a rubbing process is performed on the upper and the lower alignment films 110 and 142 in order to control the initial alignment of the liquid crystal material. In the rubbing process, a rubbing roller rolls up a rubbing material. The surface of the alignment film is rubbed by using the rubbing roller with the rubbing material in a direction defined from upward to downward. When the rubbing process is performed, as shown in FIG. 6, the column spacer 113 is randomly formed on the sub-pixel providing equal color in each pixel irrespective of the particular regulation. Thus, the sectional damage of the rubbing material is prevented.

Accordingly, it is possible to prevent unevenness of the alignment occurring when the related art column spacer is regularly arranged. As a result, the light leakage is remarkably reduced. Hereby, the black brightness is decreased and thus, the contrast ratio is improved.

FIGS. 7A to 7F are sectional views sequentially illustrating a method of fabricating the color filter array substrate of the IPS mode liquid crystal display panel according to an embodiment of the present invention.

Figure 7A:
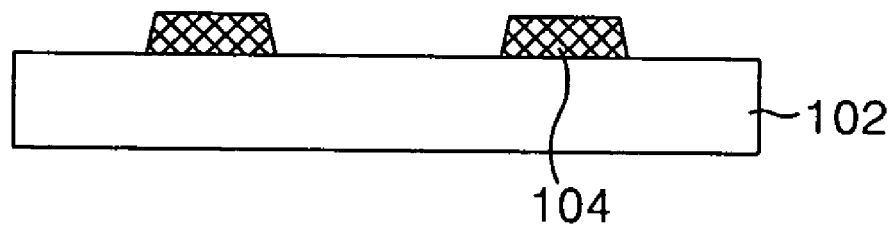
FIGS. 7A to 7F are sectional views sequentially illustrating a method of fabricating a color filter array substrate of the liquid crystal display panel of FIG. 5.

First of all, an opaque material such as a nontransparent metal or a nontransparent resin is deposited on the upper substrate 102. Then, the nontransparent material is patterned by photolithography using a mask and etching. Consequently, the black matrix 104 is formed as shown in FIG. 7A.

Figure 7B:
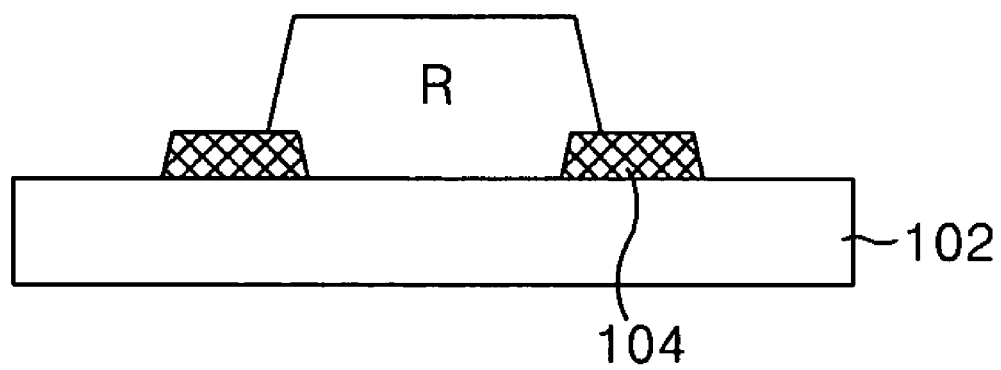

A red resin is deposited on the upper substrate 102 having the black matrix formed thereon. Then, the red resin is patterned by photolithography using a mask and etching. Consequently, a red color filter R is formed as shown in FIG. 7B.

Figure 7C:
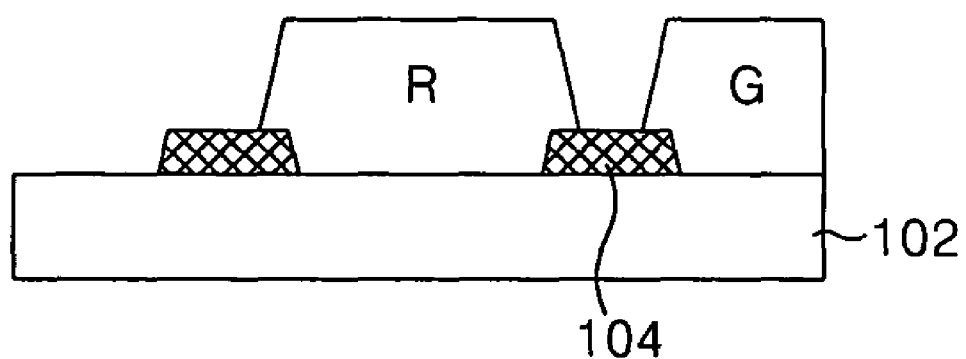

A green resin is deposited on the upper substrate 102 having the red color filter R formed thereon. Then, the green resin is patterned by photolithography using a third mask and etching. Consequently, a green color filter G is formed as shown in FIG. 7C.

Figure 7D:
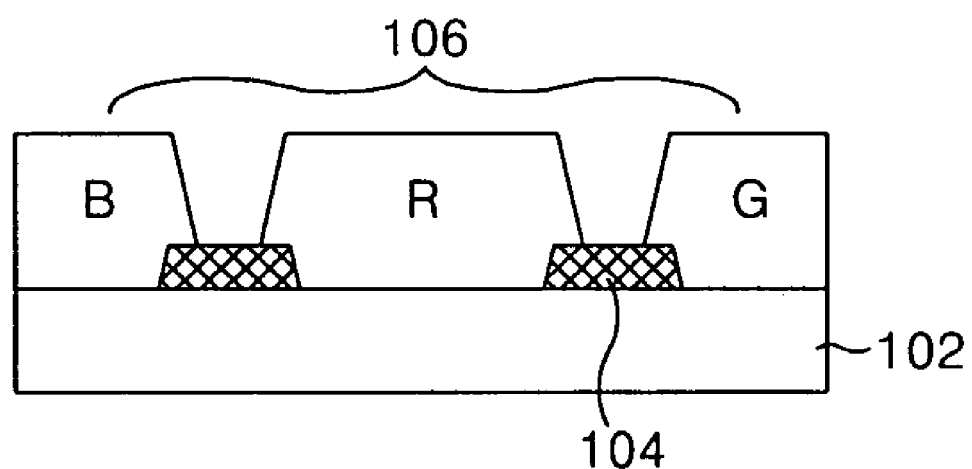

A blue resin is deposited on the upper substrate 102 having the green color filter G formed thereon. Then, the blue resin is patterned by photolithography using a mask and etching. Consequently, a blue color filter B is formed as shown in FIG. 7D.

Figure 7E:
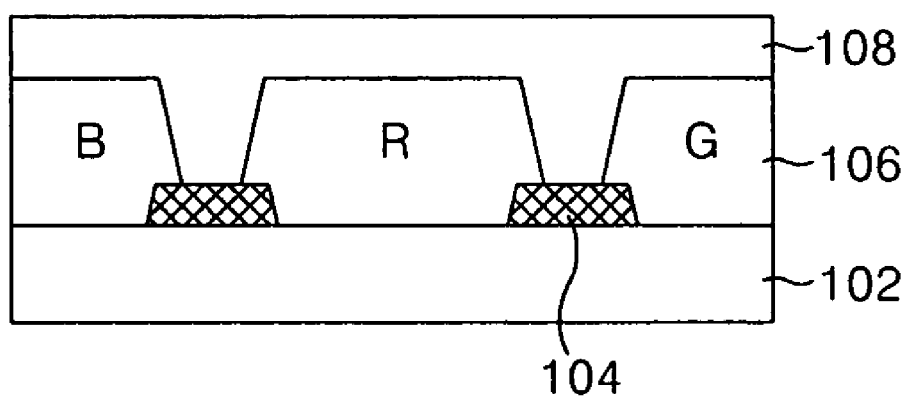

A planarization material is deposited on the entire surface of the upper substrate 102 having the red, green, and blue color filters 106 formed thereon. Consequently, the planarization layer 108 is formed as shown in FIG. 7E.

Figure 7F:
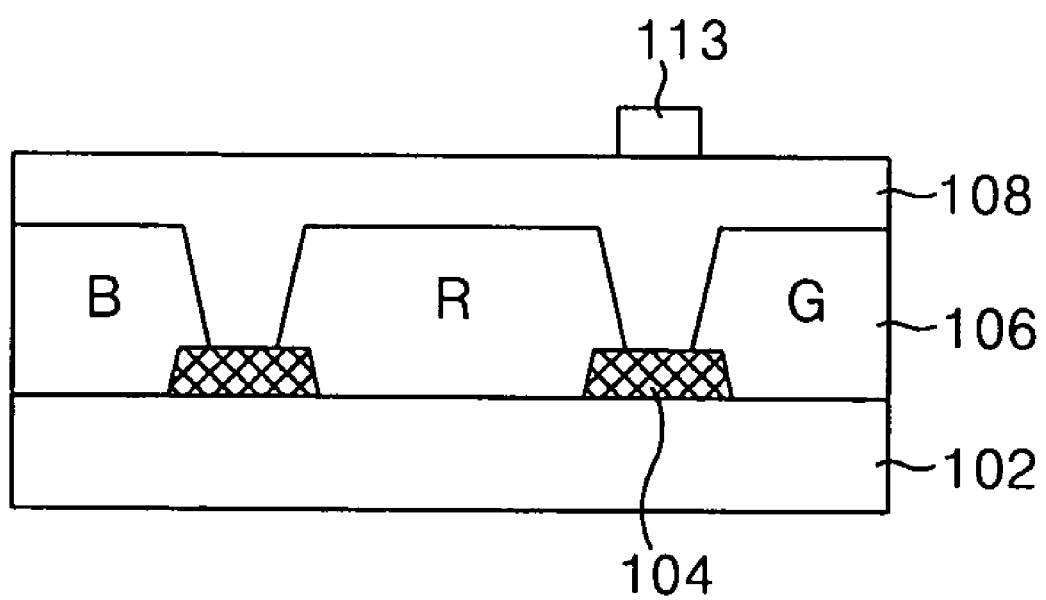

A spacer material is deposited on the upper substrate 102 having the planarization layer 108 formed thereon. Then, the spacer material is patterned by photolithography using a mask and etching. Consequently, the column spacer 113 is formed as shown in FIG. 7F. The column spacer 113 is randomly formed on the sub-pixel R region providing a red color in each pixel having the red, green and blue filters 106 without having a particular regulation.

Meanwhile, the column spacer 113 may be formed on the thin film transistor array substrate to overlap the TFT, the gate line and the data line formed on the thin film transistor array substrate.

As set forth above, the upper alignment film 110 is applied on the upper substrate 102 in which the column spacer 113 is randomly formed. The lower alignment film 142 is applied on the lower substrate 122 in which the pixel electrode 134 is formed. Thereafter, the rubbing process for aligning the liquid crystal material is performed.

A method randomly forming a column spacer without having a particular regulation in a sub-pixel representing an equal color is easily applicable to not only a liquid crystal display panel of an in-plane-switching IPS mode but also a liquid crystal display of a twisted nematic TN mode and a vertical alignment VA mode.

As described above, according to the liquid crystal display device and the method of fabricating the liquid crystal display device herein, the column spacer is randomly formed without having a particular regulation in the sub-pixel providing the equal color. As a result, when the rubbing process is performed, sectional damage of the rubbing material and the light leakage caused by the scratch by the uneven alignment of the alignment film are prevented. Accordingly, the black brightness is decreased, to thereby improve the contrast ratio.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An IPS mode display device comprising:
   a first substrate containing a plurality of column spacers; and
   a second substrate, the column spacers maintaining a cell gap between the first and second substrates,
   wherein one of the first and second substrates includes a color filter having sub-pixels of different colors,
   a first column spacer being randomly positioned on a first gate line between first and second data lines and within a first sub-pixel of the sub-pixels, and
   a second column spacer being randomly positioned on a second gate line between the first and second data lines and within a second sub-pixel of the sub-pixels,
   the first and second column spacers arranged in different positions of the first sub-pixel and second sub-pixel respectively and the first sub-pixel being the same color as the second sub-pixel, and
   wherein one of the first and second substrates includes a black matrix, and the column spacers are covered by the black matrix.

2. The display device according to claim 1, wherein a pixel contains red, green, and blue sub-pixels and at least one column spacer is located in each pixel.

3. The display device according to claim 1, wherein the first substrate includes a black matrix, the color filter formed on the black matrix, and a common electrode formed on the color filter.

4. The display device according to claim 1, wherein the first substrate includes a black matrix, the color filter formed on the black matrix, and a planarization layer formed to cover the color filter.

5. The display device according to claim 1, wherein the sub-pixel regions of the same color are formed in a substantially vertical direction.

6. The display device according to claim 1, wherein one of the first and second substrates includes both pixel and common electrodes.

7. The display device according to claim 1, further comprising an alignment layer disposed on the column spacers.

8. An IPS mode display device comprising:
   a first substrate containing a plurality of column spacers; and
   a second substrate, the column spacers maintaining a cell gap between the first and second substrates,
   wherein one of the first and second substrates includes a color filter having sub-pixels of different colors, the column spacers being randomly disposed in regions of sub-pixels of the same color,
   wherein the column spacers are only formed on the sub-pixel providing equal color, and
   wherein one of the first and second substrates includes a black matrix, and the column are covered by the black matrix,
   wherein the column spacers arranged in different positions of the same color sub-pixels.

* * * * *